Figure 5:
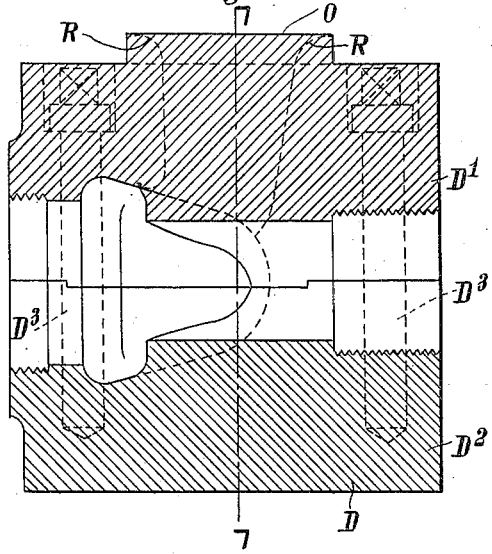

E. A. CLAREMONT, J. STRATTON & C. S. FARMER.
COATING GLAZING BARS AND OTHER IMPLEMENTS WITH LEAD OR OTHER PROTECTIVE METAL.
APPLICATION FILED APR. 12, 1915.
1,167,626.
Patented Jan. 11, 1916.
4 SHEETS—SHEET 1.
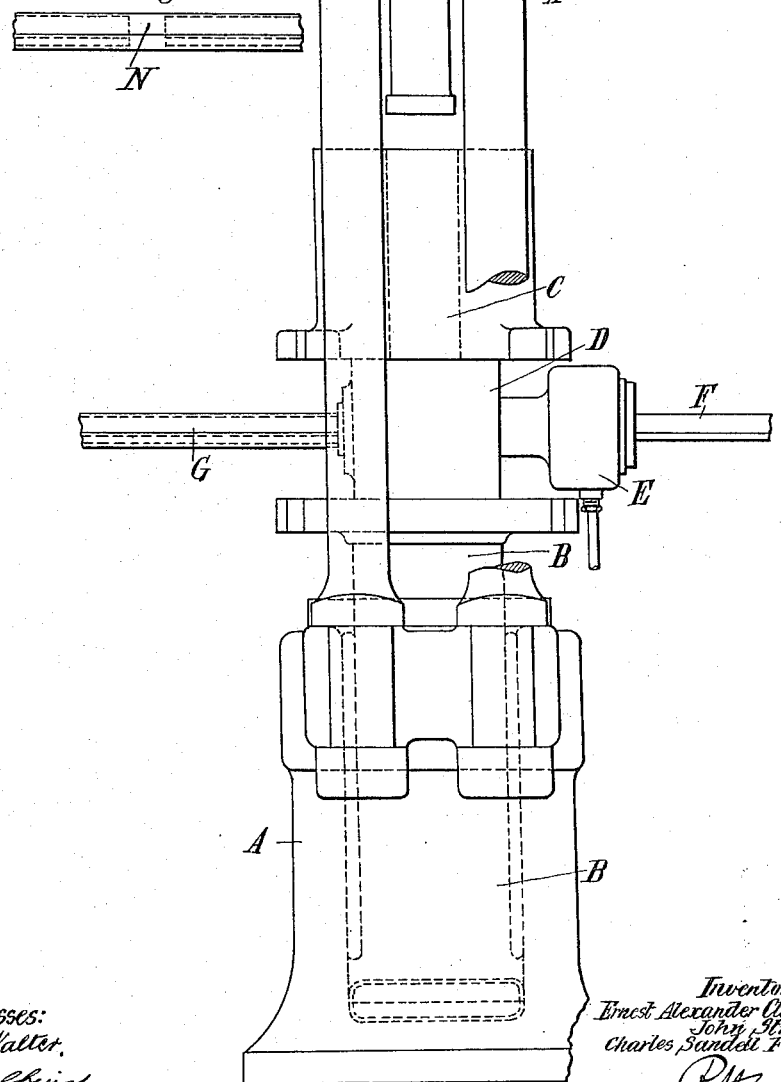

E. A. CLAREMONT, J. STRATTON & C. S. FARMER.
COATING GLAZING BARS AND OTHER IMPLEMENTS WITH LEAD OR OTHER PROTECTIVE METAL.
APPLICATION FILED APR. 12, 1915.
1,167,626.
Patented Jan. 11, 1916.
4 SHEETS—SHEET 2.
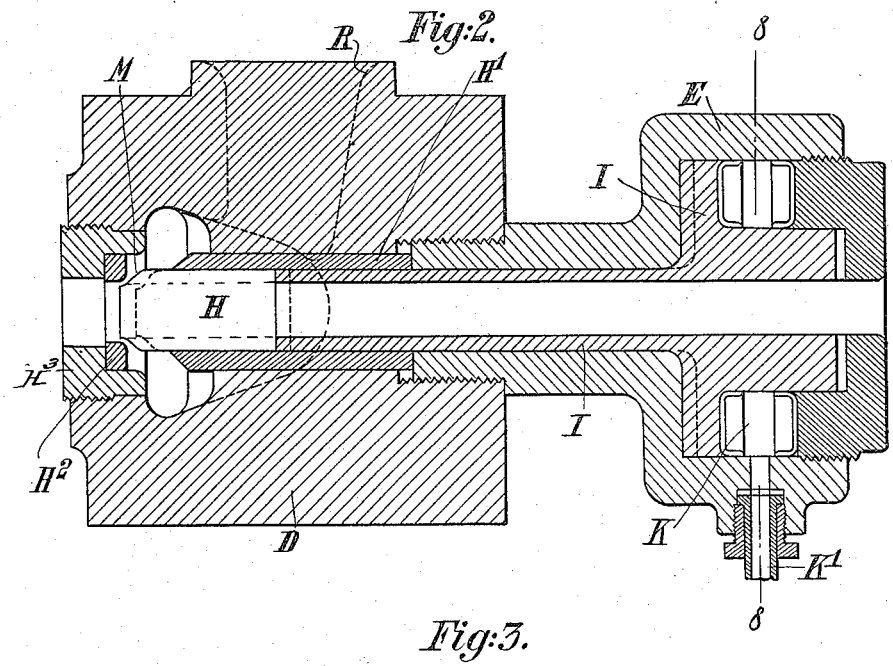
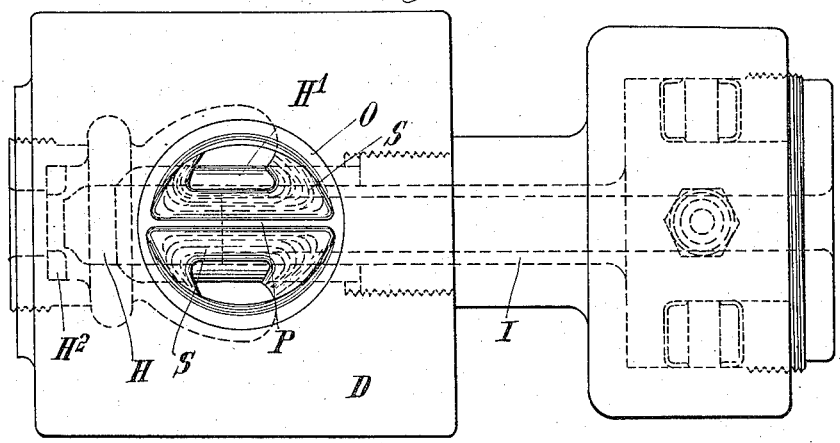
Witnesses:
Inventors:
Ernest Alexander Claremont.
John Stratton.
Charles Sandell Farmer.
by
their Attorney.

UNITED STATES PATENT OFFICE.

ERNEST ALEXANDER CLAREMONT, OF HIGH LEGH, JOHN STRATTON, OF BOWDON, AND CHARLES SANDELL FARMER, OF SALFORD, ENGLAND.

COATING GLAZING-BARS AND OTHER IMPLEMENTS WITH LEAD OR OTHER PROTECTIVE METAL.

1,167,626.      Specification of Letters Patent.      Patented Jan. 11, 1916.

Aplication filed April 12, 1915. Serial No. 20,766.

*To all whom it may concern:*

Be it known that we, ERNEST ALEXANDER CLAREMONT and JOHN STRATTON, both subjects of the United Kingdom of Great Britain and Ireland, and residing, respectively, at High Legh and Bowdon, in the county of Chester, and CHARLES SANDELL FARMER, subject of the United Kingdom of Great Britain and Ireland, residing at Salford, in the county of Lancaster, all in England, have invented certain new and useful Improvements in Coating Glazing-Bars and other Implements with Lead or other Protective Metal, of which the following is a specification.

This invention relates to the manufacture of lead and other metal pipes by the process of extrusion to form the protective covering of glazing bars and other articles and has for its object to form a solid bar of lead or other metal at the will of the operator in lieu of the hollow pipe or sheath without otherwise disturbing or stopping the operation of the press.

This invention is useful in the manufacture of lead sheathed glazing bars and where it is desired to cover the end of the bar with the same metal as the sheath in a homogeneous manner.

According to our invention we construct an ordinary hydraulic lead press with a core and a die for the purpose of passing the steel glazing bar or other article through and covering it with a sheath of lead or other metal and in addition furnish said press with auxiliary mechanism whereby the core and die may be drawn apart and replaced at the will of the operator without disturbing the press. With a press so constructed when the glazing bar or other article is passing through same and the rear end of said bar has passed out of or is about to pass out of the core, by drawing apart the core and die a solid bar of lead or other metal is formed on the rear end of and in continuation of the glazing bar or other article and when a sufficient length of said solid bar has been formed, the core can be replaced in its former position and another glazing bar or article treated. The movement of the core is effected by the elements of an additional or subsidiary hydraulic press preferably connected to the lead press, whereby the core can be forced forward or backward within such limits and at such speed as may be desired. Similarly the die can be made to move forward and backward in relation to the core.

In the accompanying drawings is shown an example of our invention.

Figure 6:
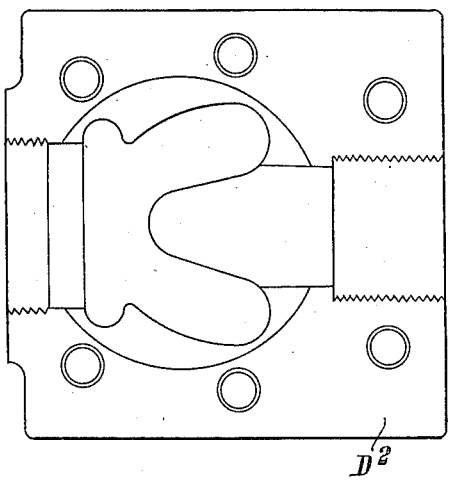
Figure 7:
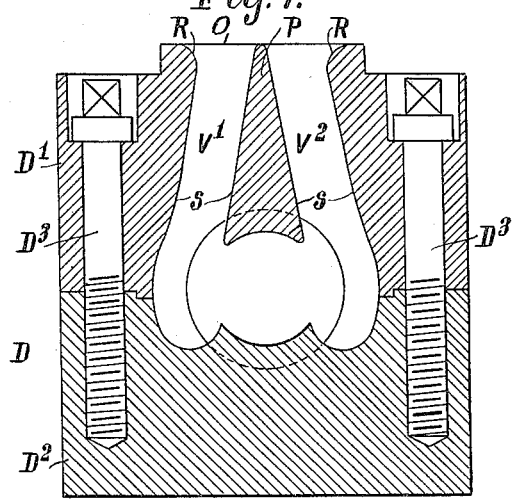
Figure 8:
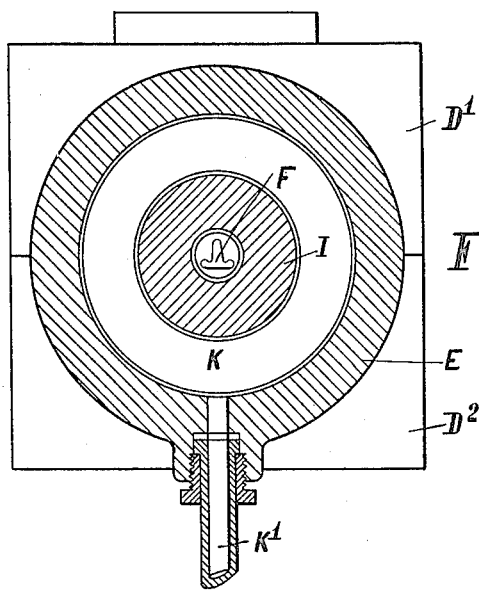
Figure 9:
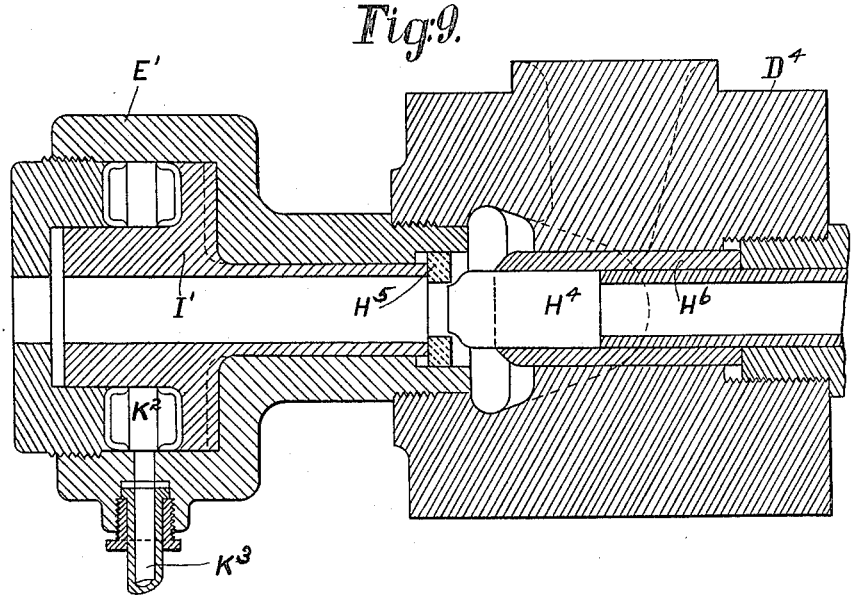

Figure 1 is a side elevation of the ordinary hydraulic lead press showing the additional or subsidiary hydraulic press mounted at the back of the core box. Figs. 2 and 3 are respectively a sectional elevation and a plan view of the core box and the additional or subsidiary hydraulic press. Fig. 4 is a detail view showing the ends of two bars which have been lead coated in the press and the solid bar of lead between them. Fig. 5 is a vertical longitudinal section through the core-box. Fig. 6 is a plan view of the lower half of said core-box. Fig. 7 is a vertical cross section of the core-box, on the line 7—7 of Fig. 5. Fig. 8 is a cross section of the subsidiary hydraulic press, on the line 8—8 of Fig. 2. Fig. 9 is a sectional elevation showing a modified form of apparatus in which the subsidiary hydraulic press is applied to the die side of the discharge opening.

In all the figures the same reference characters designate the same parts.

With reference to Fig. 1, A is the main frame of the lead press, B the main hydraulic ram, C the lead container, D the core box, E the additional or subsidiary hydraulic press, F a steel bar entering the press to be sheathed and G the said bar which has been lead coated leaving the press.

Referring to Figs. 2 to 7, H is the core held centrally in a sleeve $H^1$ in the core-box D and held in position by the ram I of the additional or subsidiary hydraulic press E. $H^2$ designates the die held in the core-box by means of an apertured threaded plug $H^3$, K is the water chamber of the subsidiary hydraulic press and $K^1$ is the water feed pipe to the same. The core box D as is usual is constructed in two halves horizontally $D^1$ $D^2$ Figs. 5 and 7 to permit (by removing the upper half $D^1$) access to the interior, the two halves when in position being secured together by bolts $D^3$. An opening O in the upper half of said box receives the lead from the container and is provided with a wall or partition P approximately representing in cross section an inverted V dividing the opening into two channels V¹ and V². The said opening at the upper part is outwardly flared as shown at R and lower down the sides S of each of the two channels are sloped to direct the flow of lead in the desired directions as indicated by the broken curved lines in Fig. 3 and in Fig. 7.

The method of operation is as follows:— The steel bars F are successively passed through the hydraulic ram I which is made hollow to receive them, thence into the hollow core H and through the die H² a predetermined distance being left between said bars, the latter being covered with lead at the point M. As the forward end of each bar in its passage through the apparatus reaches the nose of the core H the ram I and the core are advanced into the position shown by full lines in Fig. 2 by hydraulic pressure applied through the feed pipe K¹ in the chamber K and are held in this position until the rear end of the bar has reached the point M Fig. 2, whereupon by means of a suitable valve (not shown) automatically or otherwise operated the hydraulic pressure in the chamber K is suddenly released. As soon as the pressure is released from the chamber K the pressure of the lead on the nose of the latter forces back the core H in the sleeve H¹ and also the hydraulic ram I to the position indicated by the broken lines, Fig. 2, to be advanced again as the next bar comes into position. This backward and forward movement of the core is carried out without in any way interfering with or stopping the working of the press, or the continuous passing through of the bars. The effect of this movement of the core in relation to the die is that each bar in passing through the die receives a coating of lead and in between adjacent bars there is formed a solid bar of lead N (Fig. 4) of the same cross section as the coated bar, the coatings and bars of lead being homogeneous. The movable part of the additional or subsidiary hydraulic press and the core may be moved both backward and forward by hydraulic pressure. As shown in Fig. 9, we may also apply the hydraulic ram I¹ of the subsidiary press E¹ to the die side of the core box D⁴, and move the die H⁵ instead of the core H⁴ in the same manner, or, as will be readily understood, we may move both the die and the core by providing a hydraulic ram for each of them. The core H⁴ operates in the sleeve H⁶. As the bars are received from the apparatus they are sawed apart through the solid bars N of lead thus producing bars coated throughout with lead homogeneously and without the necessity of sealing the ends.

It is not new to cover the ends of lead coated glazing bars with lead by plumbing or otherwise fastening on caps or end pieces all of which operations involve apart from the cost involve a risk of defects but so far as we are aware it is novel to cover the ends of the bar homogeneously with the actual coating.

What we claim as our invention and desire to secure by Letters Patent of the United States is:—

1. The combination of a hydraulic lead press, adapted to receive articles to be coated, a co-acting core and die in said press adapted to extrude a pipe to form a metal coating for said articles, and means for causing a relative movement of said core and die, whereby between adjacent articles a solid mass of metal is produced homogeneous with said coating.

2. The combination of a hydraulic lead press, adapted to receive articles to be coated, a core box therein to receive molten metal, a co-acting core and die in said corebox, adapted to extrude a pipe to form a metal coating for said articles, an auxiliary hydraulic press and means operated thereby to cause a relative movement of said core and die for the purpose of producing between adjacent articles a mass of metal homogeneous with said coating.

3. The combination of a hydraulic lead press, adapted to receive glazing bars to be coated, a core-box therein to receive molten lead, a die and hollow core co-acting therewith disposed in said core-box, and adapted to extrude a pipe to form a lead coating for said bars, an additional hydraulic press, a ram in the latter and means for actuating said ram to cause a relative movement between said core and die, whereby between adjacent bars a solid mass of lead of the same cross section as the bars is produced, homogeneous with said coating, and forming an end covering for said bars.

In witness whereof we have signed this specification in the presence of two witnesses.

ERNEST ALEXANDER CLAREMONT.
JOHN STRATTON.
CHARLES SANDELL FARMER.

Witnesses:
CHARLES BAILEY BESWICK,
MALCOLM SMETHURST.